(12) United States Patent
Ludwig et al.

(10) Patent No.: US 8,777,287 B2
(45) Date of Patent: Jul. 15, 2014

(54) SLIDING HANDLE REACHER

(71) Applicant: DMS Holdings, Inc., West Des Moines, IA (US)

(72) Inventors: Kristin Ludwig, Grayslake, IL (US); Joel Gray, Winthrop Harbor, IL (US); Olivier Franck Currat, Chicago, IL (US); James Blaine Wolford, Chicago, IL (US); Brian David Blankstein, Chicago, IL (US); Alexander Nathan Garfield, Chicago, IL (US); Andrea Ellen Fraga, Potomac, MD (US); Saad Ahmad Chaudry, Skokie, IL (US); Martin Rathgeber, Chicago, IL (US); Leo Chan, Kildeer, IL (US); Tara Marie Arnold, Buffalo Grove, IL (US); Alan Yefsky, Hawthorn Woods, IL (US)

(73) Assignee: DMS Holdings, Inc., West Des Moines, IA (US)

( * ) Notice: Subject to any disclaimer, the term of this patent is extended or adjusted under 35 U.S.C. 154(b) by 0 days.

(21) Appl. No.: 13/796,007

(22) Filed: Mar. 12, 2013

(65) Prior Publication Data
US 2014/0035305 A1 Feb. 6, 2014

Related U.S. Application Data

(60) Provisional application No. 61/678,710, filed on Aug. 2, 2012.

(51) Int. Cl.
*A47F 13/06* (2006.01)
(52) U.S. Cl.
USPC ............................ 294/209; 294/111; 294/902

(58) Field of Classification Search
USPC ............... 294/1.4, 8.5, 11, 22, 100, 111, 191, 294/209–211, 50.8, 50.9, 902; 56/400.12
See application file for complete search history.

(56) References Cited

U.S. PATENT DOCUMENTS

| 276,572 | A | * | 5/1883 | Evans ............................ 294/22 |
| 986,771 | A | | 3/1911 | Siegel et al. |
| 1,014,785 | A | | 1/1912 | Tetrault |

(Continued)

FOREIGN PATENT DOCUMENTS

| CN | 101865634 A | 10/2010 |
| CN | 201740459 U | 2/2011 |

(Continued)

OTHER PUBLICATIONS

CN 101865634, Tingzhong Xu—English Abstract.

(Continued)

*Primary Examiner* — Dean Kramer
(74) *Attorney, Agent, or Firm* — Fredrikson & Byron, P.A.

(57) ABSTRACT

A reaching apparatus is provided for allowing a user to utilize gross motor skills to actuate the reaching apparatus. The reaching apparatus includes a fixed and a sliding handle on a shaft. An internal pulley system is connected between the first and second handles such that sliding of the second handle activates the pulley system to move the claw of the reaching apparatus between an open and closed configuration. The claw may be locked in an open and/or closed configuration by rotation of the handle on the shaft. The pulley system can be set to specific resistance to activate the claw upon different gross motor levels.

18 Claims, 8 Drawing Sheets

(56) References Cited

U.S. PATENT DOCUMENTS

| | | | |
|---|---|---|---|
| 1,350,331 A | 8/1920 | Pedersen | |
| 1,526,257 A | 2/1925 | Thayer | |
| 2,181,520 A | 11/1939 | Pedersen | |
| 3,601,966 A * | 8/1971 | Kerry | 56/400.12 |
| 4,192,539 A * | 3/1980 | Broyles et al. | 294/104 |
| 4,253,697 A * | 3/1981 | Acosta | 294/115 |
| 4,374,600 A * | 2/1983 | van Zelm | 294/111 |
| 4,378,671 A * | 4/1983 | Gascon | 56/400.12 |
| 4,613,179 A | 9/1986 | van Zelm | |
| 4,891,586 A | 1/1990 | Leber et al. | |
| 4,962,957 A | 10/1990 | Traber | |
| D333,075 S * | 2/1993 | Incantalupo et al. | D8/51 |
| 5,294,162 A | 3/1994 | Grimes | |
| 5,324,086 A * | 6/1994 | Hammer | 294/210 |
| 6,257,634 B1 * | 7/2001 | Wei | 294/111 |
| 6,283,521 B1 * | 9/2001 | Agrati | 294/50.8 |
| 6,336,314 B1 * | 1/2002 | Crevier | 56/400.12 |
| 7,934,756 B2 * | 5/2011 | Kroeze | 294/210 |
| 2004/0040093 A1 | 3/2004 | Lee | |
| 2010/0102583 A1 | 4/2010 | McCoy et al. | |

FOREIGN PATENT DOCUMENTS

| | | |
|---|---|---|
| GB | 190827384 A | 0/1909 |
| GB | 190913789 A | 0/1909 |
| JP | 2008-49468 A | 3/2008 |

OTHER PUBLICATIONS

CN 201740459, Youzhou Song—English Abstract.
JP 2008-49468, Ueno Kiyomi—English Abstract.

* cited by examiner

SLIDING HANDLE REACHER

CROSS-REFERENCE TO RELATED APPLICATIONS

This application claims priority under 35 U.S.C. §119 to provisional application Ser. No. 61/678,710, filed Aug. 2, 2012, which is herein incorporated by reference in its entirety.

FIELD OF THE INVENTION

The invention relates generally to the art of reaching devices, and particularly to apparatuses for use in assisting with reaching and grabbing items. In particular, a sliding handle reaching apparatus, also known as a reacher, is provided to assist persons in using gross motor skills, as opposed to fine motor skills, to reach and pick up items. Methods of employing the same are also provided.

BACKGROUND OF THE INVENTION

A variety of reachers or reaching devices or apparatuses (also referred to as grabbers or grabbing devices) are commercially available. Such devices are available in various shapes, sizes, and colors and are most often produced using plastic and/or aluminum components. Reachers can be used to assist in grasping both large and small items. Most often, reachers have a jaw, claw, finger, or other grasping member at one end of a shaft that can manually rotate, along with a handle at the opposing end of a shaft. The reachers are employed by a user squeezing the trigger on the handle, which activates the jaw to close around the desired item in need of reaching. Some reachers employ a locking mechanism to keep the jaw (or other opening) shut once an item has been grasped and is held in the jaw. At this time, a user sets the reacher down and releases the item from the jaw.

Several disadvantages exist with commercially available reachers. For example, the jaws (or other opening) on these reachers lack the ability to pick up both large and small items with confidence and consistency. Similarly, the jaws (or other opening) often are unable to pick up items having smooth surfaces as a result of being unable to grasp or make sufficient contact with the item.

In addition to the design deficiencies of various commercially available reachers, many users, including for example, the handicapped and/or elderly, are unable to operate the devices due to the use of a vertical grip and/or triggers, which can cause pain in the user's fingers, wrists, arms, back and/or neck. In particular, users having limited mobility find significant difficulty in operating the reachers using vertical grips. Additional difficulty is presented for users wherein a reacher employs a locking mechanism that requires further fine motor use. Exemplary commercially available reachers presenting such difficulties for users are more fully described in U.S. Pat. Nos. 4,711,482, 6,848,731, 7,665,782 and 8,029,035, which are herein incorporated by reference in their entirety.

Therefore, there exists a need in the art for an improved reacher or grasping member that can grasp and hold a variety of objects, and that can be operated using gross motor skills, as opposed to fine motor skills. There is also a need in the art for a reacher that can be rotated and locked in an easier manner.

SUMMARY OF THE INVENTION

Therefore, it is a primary object, feature, and/or advantage of the present invention to improve over deficiencies in the art.

It is another object, feature, and/or advantage of the invention to provide an improved reaching device that does not require fine motor skills for a user to operate the device.

It is still another object, feature, and/or advantage of the invention to provide an improved reaching device that easily grasps both small and large items on a variety of surfaces.

It is a yet another object, feature, and/or advantage of the present invention to provide a reaching device including a claw that can be locked and unlocked using gross motor skills.

It is a further object, feature, and/or advantage of the invention to provide a reaching device that includes a claw member that can be rotated to reach items in various positions.

It is still a further object, feature, and/or advantage of the present invention to provide a reaching device that includes the use of hand grips on the handles, different configurations for the claw, telescoping handles to change the length of the reacher, visual and/or audio feedback on the reacher, and a light added to a portion of the reacher to aid in viewing what the operator is wanting to reach.

These and/or other objects, features, and advantages of the present invention will be apparent to those skilled in the art. The present invention is not to be limited to or by these objects, features and advantages. No single embodiment need provide each and every object, feature, or advantage.

Therefore, according to an aspect of the invention, a reaching apparatus is provided. The apparatus includes a shaft having first and second ends, a fixed handle positioned on the shaft adjacent the first end of the shaft, a second handle positioned on the shaft and movable in relation thereto, and a claw positioned at the second end of the shaft and having an open configuration and a closed configuration. A pulley system positioned generally within the shaft is connected to the fixed handle, second handle, and claw. Sliding the second handle on the shaft away from the fixed handle causes the claw to move from the open configuration to the closed configuration.

The reaching apparatus may also include a locking mechanism connected to the claw such that the claw can be locked in the closed configuration. The claw can include attachment members to aid in grasping an object. Furthermore, a haptic, auditory, or visual device can be operatively connected to the claw to provide feedback to indicate the status of the grasping members of the claw.

According to another aspect of the invention, a reaching apparatus for providing distant grasping of an object using gross motor skills is provided. The apparatus includes a first handle, a second handle connected to the first handle via a pulley system and movable relative to the first handle, and a claw operatively connected to the pulley system and comprising two or more grasping members movable relative to one another. Moving the second handle away from the first handle operates one or more ropes of the pulley system to open and close the grasping members of the claw.

According to yet another aspect of the invention, a reaching apparatus is provided. The apparatus includes an extendable shaft having a first end and opposite second end, a fixed first handle positioned at the first end of the shaft, a movable second handle positioned adjacent the first handle on the shaft and connected to the first handle via a pulley system, and a claw operatively connected to the first and second handles via the pulley system and comprising two or more grasping members movable relative to one another. The pulley system is housed within the handle and comprises a fixed block and a shuttle operatively connected to the fixed block and the claw such that movement of the second handle towards the claw moves the shuttle towards the fixed block, which closes the claw.

DETAILED DESCRIPTION OF THE PREFERRED EMBODIMENTS

Figure 1:
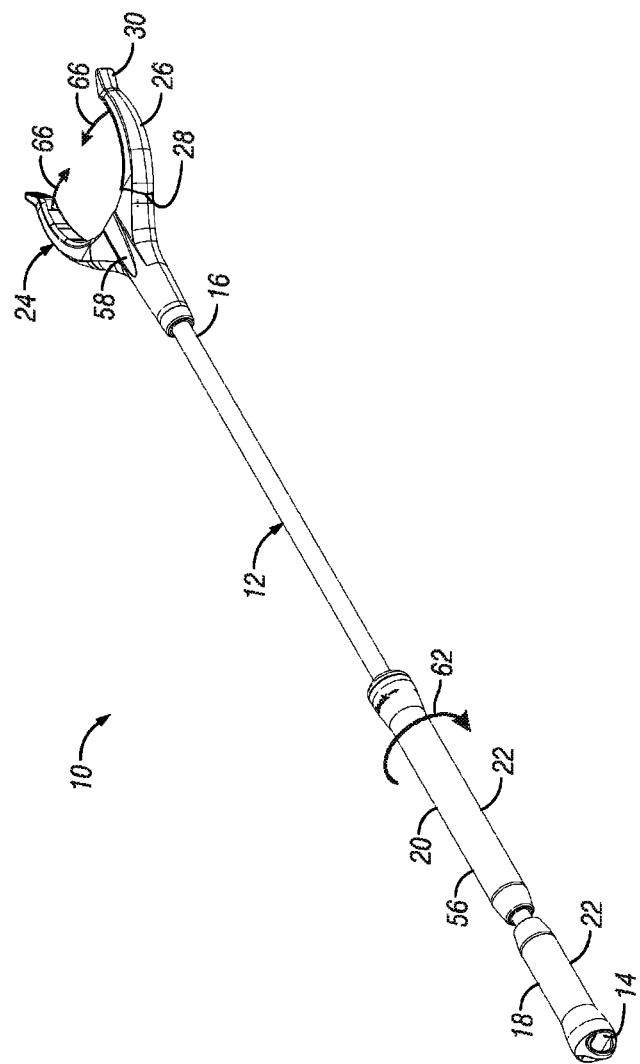
FIG. 1 is a perspective view of a reaching apparatus according to the invention.
Figure 2:
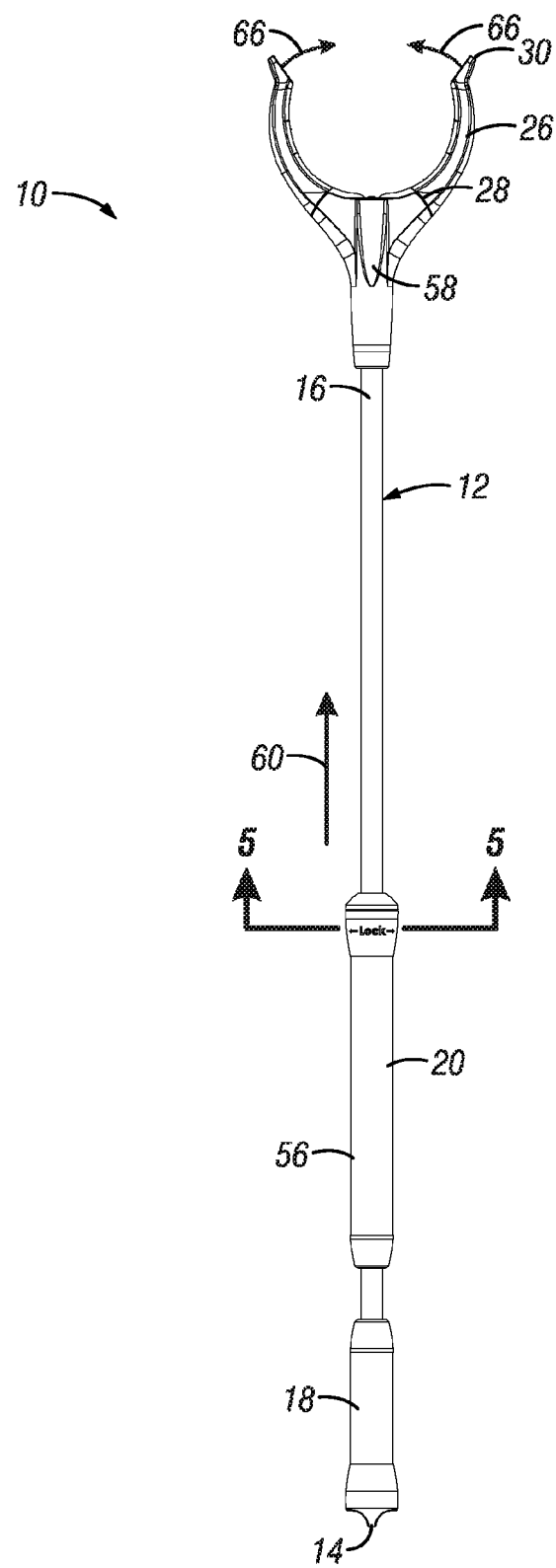
FIG. 2 is a front elevation view of the reaching apparatus.

FIGS. 1 and 2 are views of a reaching apparatus 10 according to the present invention. The reaching apparatus 10 provides a new and improved way for allowing an individual to reach and grab or grasp an object at a distance from the individual using gross motor skills, as opposed to fine motor skills. For example, individuals with a disability, loss of fine motor skills, or loss of strength in their hands and/or arms may not be able to utilize traditional reaching and/or grasping utensils due to the loss of fine motor skills. The reaching apparatus 10 according to the present invention provides a way for the individual to use gross motor skills to operate the reaching apparatus 10. The apparatus 10 will allow an individual to reach and grasp an item that is either out of reach or that the person is incapable of grasping due to the loss of fine motor skills, including the ability to grasp an item with fingers.

The reaching apparatus 10 shown in the figures includes a shaft 12. The shaft 12 is a generally straight shaft used to connect the components of the apparatus 10. The shaft 12 of the invention may be a unitary piece of fixed length, or may comprise telescoping elements to allow for the length of the shaft 12 to be varied to allow for greater flexibility and use of the apparatus 10. For example, the shaft 12 may include multiple components or elements that can be telescoping with respect to one another such that they slide or move relative to one another and can be housed within one another to adjust the length of the shaft. Other means of adjusting the length of the shaft may be included, such as by the addition and removal of sections of the shaft. Furthermore, the shaft can comprise a molded plastic or other rigid and hollow material.

The shaft 12 includes a first end 14 and an opposite second end 16. Positioned generally at or near the first end 14 is a first handle 18, which may be fixed in place at the location on or adjacent to the shaft 12. As shown throughout the figures, the handle 18 may be fixed via a screw 15 positioned through the end of the shaft 12 and into a portion of the handle 18 to hold the handle in place. At the second end 16 of the shaft 12 is a claw or grasping apparatus 24. The claw 24 includes two or more grasping members or fingers 26, which are moveable between an open position and closed position to grasp items via use of the reaching apparatus 10. The claw 24 may include pivot points 28 (at least one for each finger) at which the fingers 26 are rotatable to rotate in the direction shown by the arrow 66 towards one another to close around an object or item, or to position an item therebetween. Also positioned on the shaft 12 is a second handle 20, which may be moveable, e.g., slidable, on the shaft and relative to the first fixed handle 18. As will be understood, the movement of the handle 20 in a direction generally shown by the arrow 60 in FIG. 2 will close the fingers 26 of the claw 24. Rotation of the second handle 20 can lock the fingers 26 in a generally closed configuration such that the item or object grasped between the fingers 26 can be moved to a desired location without continued pressure on the second handle 20.

Also shown in FIGS. 1 and 2 are hand grips 22 on the first and second handles 18, 20, which may be non-prescriptive hand grips to allow the user to grasp the handles however they may choose. Furthermore, the non-prescriptive handles allow the reaching apparatus 10 to be able to be used in a full 360° manner, i.e., a user can rotate the apparatus as needed and it can still be used to grasp an item. In addition, a light or lights 58 may be generally positioned at the claw 24 to provide illumination at the claw for the individual to better see the item or object that they are intended to grasp with the reaching apparatus 10. Furthermore, an indicator and/or feedback device 56 may be operatively connected to the claw to provide feedback to the user as to the status of the claw. For example, the feedback device 56 may be a haptic device, auditory device, or visual device to alert or indicate to the user whether the claw 24 is in a locked or unlocked position. This will provide better confidence to the user of the reaching apparatus 10 to know when they are able to bring the item or object towards them or to the intended end location without worrying of dropping the item. Therefore, when such an electronic device is used, a battery (not shown) may be housed within a portion of the shaft 12 and electrically connected to the feedback device 56. It should be appreciated that the light and/or feedback device can be positioned generally anywhere on, in, or attached to the reaching apparatus 10.

Figure 3:
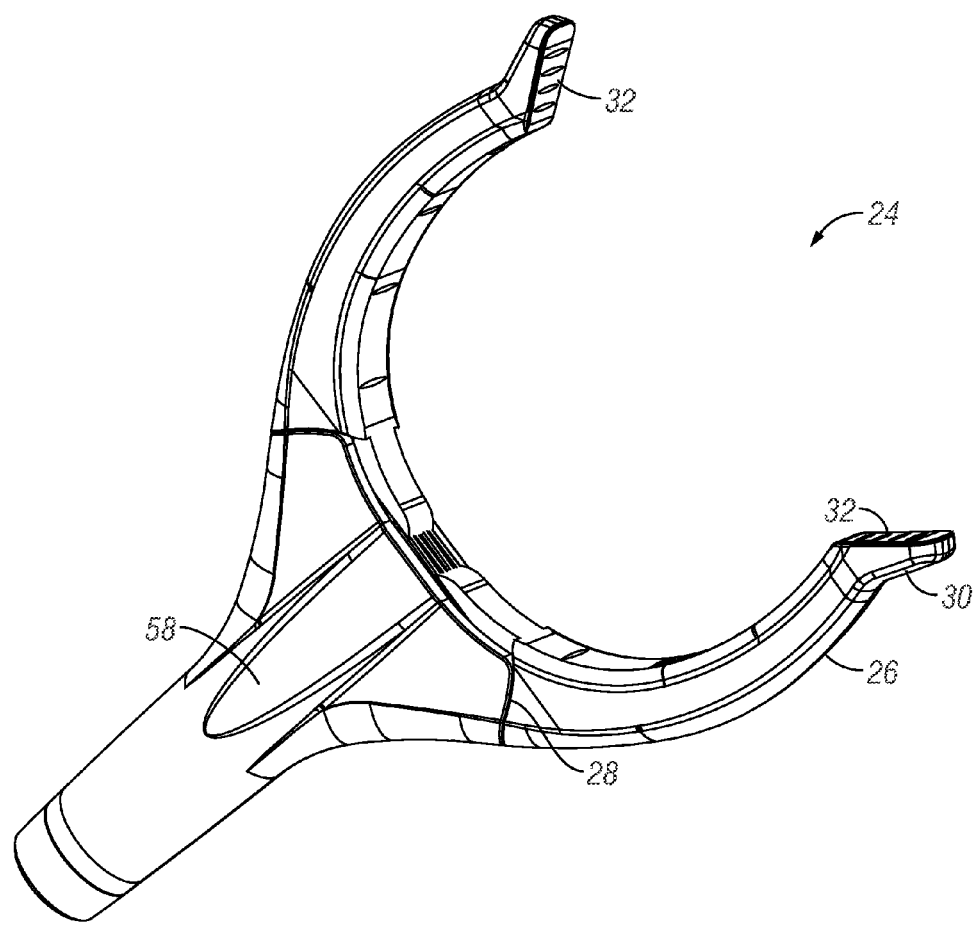
FIG. 3 is a view of a claw used with the reaching apparatus according to an aspect of the invention.
Figure 4:
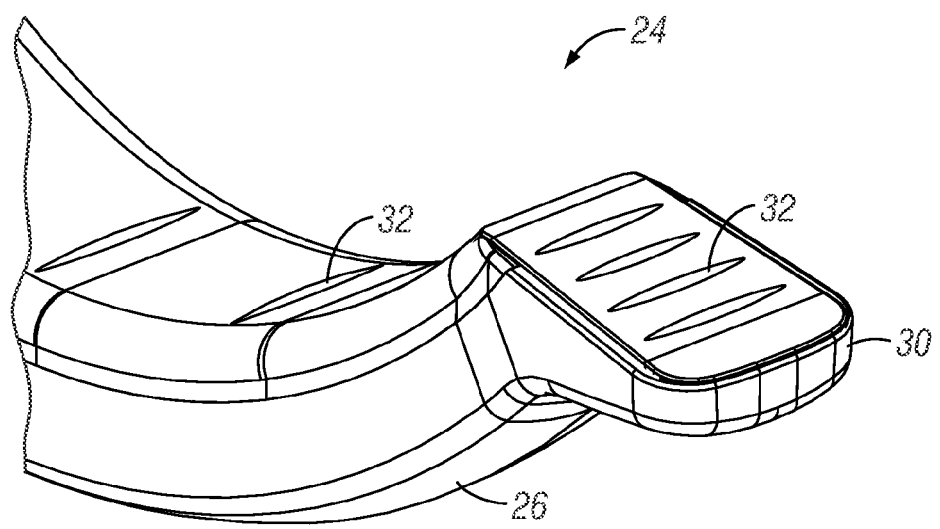
FIG. 4 is an enlarged view of a portion of the claw of FIG. 3.

FIGS. 3 and 4 are perspective and enlarged views of the claw member 24 according to an aspect of the present invention. As mentioned, the claw 24 shown in the figures includes two grasping members or fingers 26, which are rotatable about pivot points 28 towards one another to close around or about an object that can fit between the fingers 26 when in the open configuration shown in FIG. 3. Thus, the apparatus works by placing the fingers 26 around or adjacent the object and closing the claw to grasp the object between at least a portion of the fingers 26. Once the item has been moved to its end use location, the claws will rotate in the opposite direction about the pivot points 28 into the open configuration shown in FIG. 3 to release the object from the grasp of the fingers 26.

FIGS. 3 and 4 also show the fingers 26 and the claw 24 having a tip region 30 and including attachment members 32 positioned generally along the interior of the fingers 26. The tip 30 of the fingers 26 provides a larger opening to allow the claw 24 to be positioned generally around or adjacent an object to be grasped by the reaching apparatus 10. The attachment members 32 can be positioned at a single location or along the entire interior of the fingers 26 to aid in grasping an object, or can be positioned in generally any configuration at the claw 24. For example, magnets, adhesives, elastomers, or other higher friction elements may be attached to the claw 24 to aid in gripping an object by the reaching apparatus 10. The attachment members 32 can be affixed to the fingers 26, can be positioned within the fingers 26, or can be other attached to the fingers 26 of the claw 24. The addition of the attachment members 32 will reduce the chance of the objects slipping through the fingers 26 of the claw during movement of the object when the claw 24 is grasping said object. However, it is to be appreciated that the attachment members 32 need not be included in all embodiments. In addition, while a list of potential attachment members 32 have been included, it is to be appreciated that this is not an exhaustive list, and that any element that may aid in grasping an object by the fingers 26 of the claw may be included with the fingers 26.

The fingers 26 of the claw 24 may comprise a graduated thermal plastic elastomer (TPE), which is also sometimes referred to as a thermal plastic rubber. The claw 24 is graduated such that it is thicker at the portion of the claw fingers 26 near the pivot points 28 to grip larger items, while being thinner near the front tips 30 of the claw to grip smaller items therebetween. In addition, the claw 24 may not fully comprise the TPE material and instead may comprise a molded plastic with a TPE material overmolded on the plastic about the interior of the fingers 26 of the claw such that the TPE materials do not go all the way to the edge and/or do not surround the claw member. However, it is also appreciated that the TPE material be fully overmolded about the entire external surface of the claw to increase the friction between the claw and the object being grasped.

In addition, while a claw 24 having two fingers 26 is shown in the figures, it is to be appreciated that generally any number of fingers providing a grasping movement between an open and a closed configuration can be included as part of the present invention. For example, if three fingers 26 are included, the three fingers can be radially positioned around the shaft 12 of the reaching apparatus 10 and will be moveable between an open configuration where the fingers are away from the axis of the shaft, and a closed position where the fingers move towards the axis of the shaft 12. If four fingers 26 are included, the present invention contemplates that the fingers may either be radially mounted about the shaft 12, or may be separated similar to the configuration shown in FIG. 3 wherein two fingers will be on either side of the shaft axis. The additional fingers on either side of the axis and being generally adjacent to another finger will aid in the strength of the claw member and may allow the reaching apparatus 10 to grasp and move larger items. As mentioned above, the reaching apparatus 10 may include a light or lighting system 58, which may be positioned within the claw 24, positioned on the claw 24, or anywhere else on the reaching apparatus 10 to provide illumination at or near the claw for aiding in seeing the item to be grasped by the claw 24. It should also be appreciated that the fingers 26 and claw 24 may comprise generally any size in order to provide for varying sized objects to be grasped by the claw 24.

The claw 24 can also be articulable or pivotable. For example, the invention contemplates that the claw be connected to the shaft 12 such that the claw can be pivoted relative to the axis of the shaft. This will allow an item positioned at a higher location to be grasped and moved with the claw substantially parallel to the ground, even when the shaft is at an angle to the ground. The claw 24 can be rotated or pivoted back in line with the shaft axis once the item is near the user, near the ground, or otherwise near or at its end use location.

Use of the reaching apparatus 10 can be as follows. A user positions one hand on the fixed first handle 18 and one hand on the second, moveable handle 20. Otherwise, the fixed handle 18 can be attached to a rigid object such that its location is fixed, while a user uses both hands to grasp the second handle 20. Sliding of the second handle 20 in the direction shown by the arrow 60 will actuate the closing movement of the claws 24 to move the claws in the direction shown by the arrows 66. Once around an object, the reaching apparatus can be manipulated to move the object to an end use location. To release the item from the claw, the second handle 20 can move in the opposite direction towards the first handle to open or release the fingers 26 of the claw, thus releasing the item from the grasp of the claw 24.

In order to more easily move the object while in the grasp of the claw, the present invention also may include the use of a locking mechanism 48 within the shaft 12, which will lock the fingers 26 of the claw 24 in a closed configuration such that continued pressure is not required on the second handle 20 to maintain the claw in the closed configuration. The invention contemplates that the locking mechanism 48 may be operated by twisting or rotating the second handle 20 in the direction shown by the arrow 62 in FIG. 1. Once locked, the claw will remain in the closed configuration until the second handle is rotated in the opposite direction, thus releasing the claw from the closed configuration.

Figure 5:
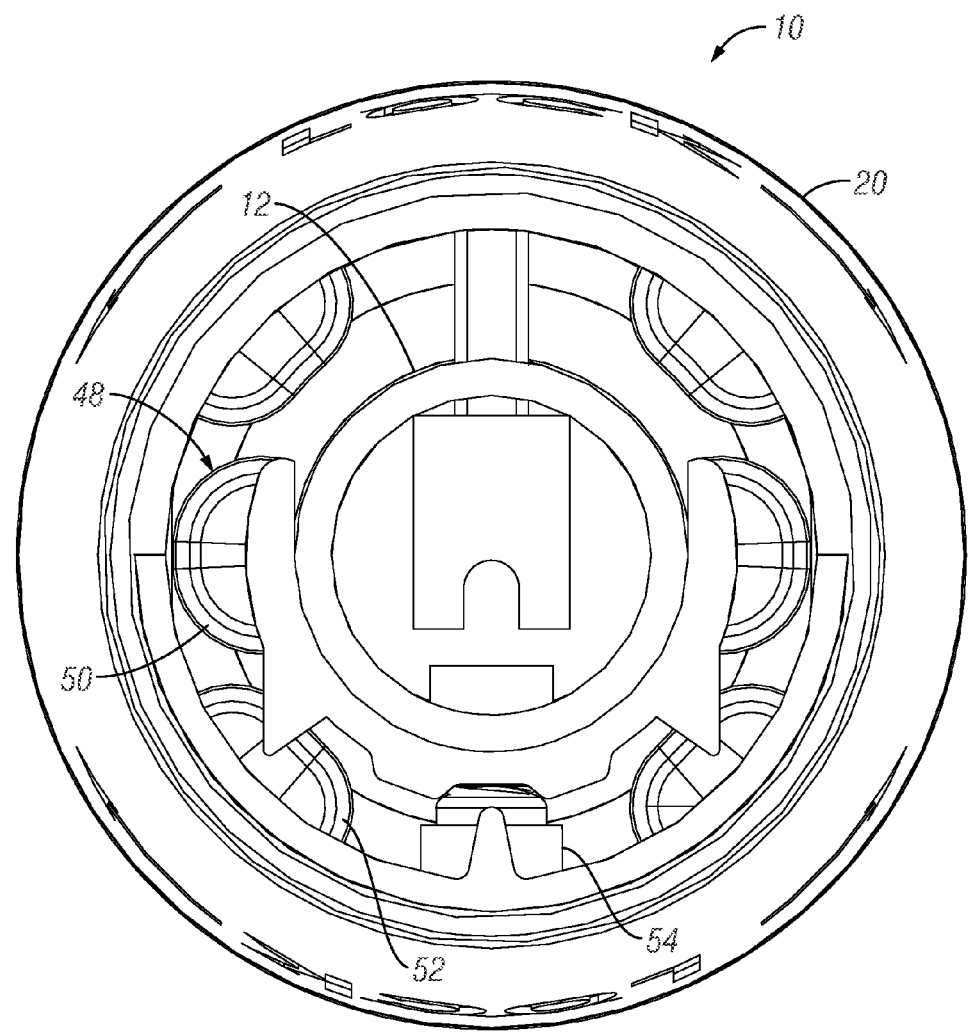
FIG. 5 is a view showing a locking mechanism for use with a reaching apparatus.
Figure 6:
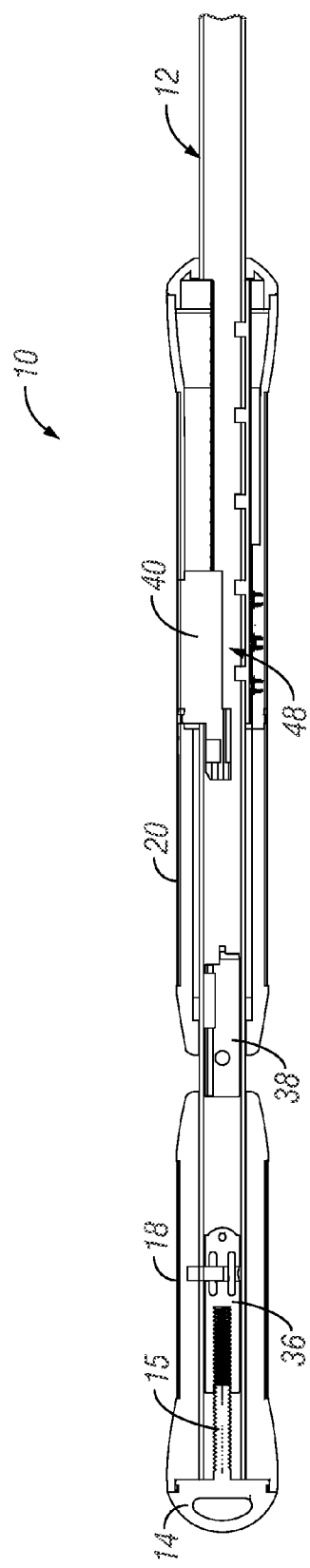
FIG. 6 is a sectional view of a portion of the reaching apparatus showing an embodiment of a pulley system for use with the apparatus.

An embodiment of the locking mechanism 48 according to the present invention is generally shown in FIG. 5, which is a sectional view of the reaching apparatus 10 according to the line 5-5 in FIG. 2. FIG. 6, which is a side sectional view of the first and second handles 18, 20 and shaft 12 of the reaching apparatus 10 also shows components of the locking mechanism 48 according to an embodiment of the present invention. The locking mechanism 48 according to the figures comprises a first comb member 50 positioned outside the shaft 12 and either comprising a portion of the shaft 12 or being included as part of an insert within the shaft 12. A second comb member 52 is positioned adjacent the first comb member 50. The second comb member 52 can comprise the interior of the second handle 20, the interior of the shuttle 40, or can comprise an insert positioned within the interior of the second handle 20. The first and second comb members comprise protrusions or locking teeth thereon. When the second handle 20 is turned approximately one-quarter turn, the locking teeth lock into place with one another, thus locking the handle in place and subsequently locking the claw 24 in the closed configuration. Pressure springs 54 aid in keeping the locking mechanism 48 locked such that when the handle 20 is turned, it cannot rotate back into the non-locked position except when turned the opposite direction of the locking direction. A plunger-type spring 54, in relation to the shaped channel, aids in smooth sliding action and in keeping the reacher 10 in the locked or unlocked position.

Figure 7:
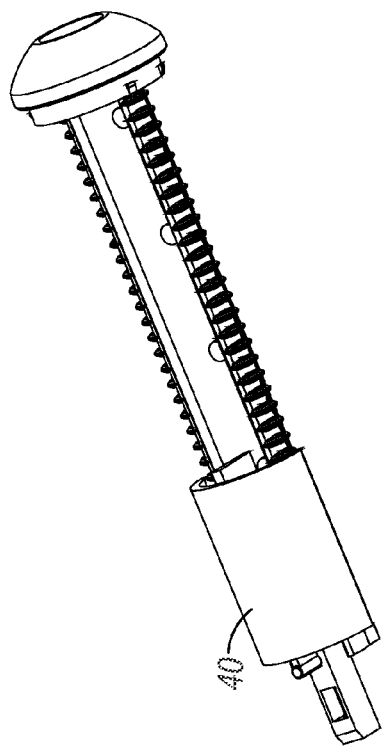
FIG. 7 is a perspective sectional view of the shaft of a reaching apparatus according to an embodiment of the invention.
Figure 7:
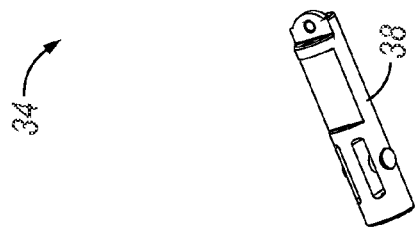
Figure 7:
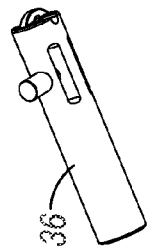
Figure 8:
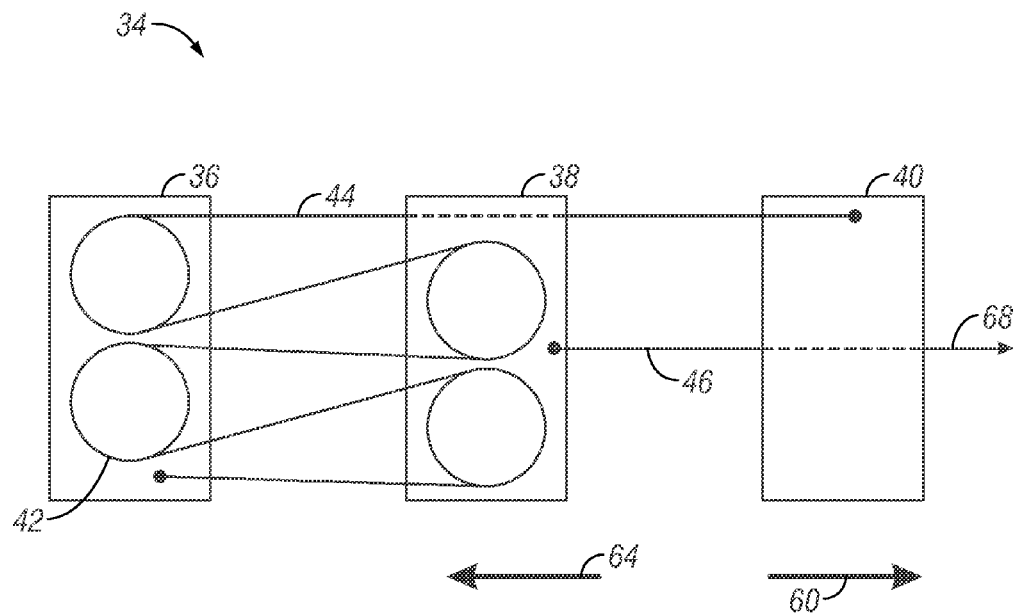
FIG. 8 is a schematic view of a pulley system for use with a reaching apparatus according to an aspect of the invention.

FIGS. 6-8 show the internal functions of the reaching apparatus 10, which includes a pulley system 34 for activating the claw 24 based upon the sliding or movement of the handle 24 along the shaft 12. As is shown in FIG. 6, the pulley system 34 is positioned substantially within the shaft 12 of the reaching apparatus 10. The pulley system 34 includes a fixed pulley member 36, a sliding pulley member 38, a shuttle 40, a first rope 44, and a second rope 46. The fixed pulley member 36 is positioned generally within the shaft 12 at the first end 14 thereof and within the fixed or first handle 18. As shown in FIG. 6, the member 36 may be fixed at the location by connection with a screw 15 positioned through an end of the first end 14 of the shaft 12. The screw member 15 also is attached to the first handle 18 to hold the handle in place at the location. The sliding pulley member 38 is positioned away from the fixed member 36. The shuttle 40 may be configured to be attached to or part of the sliding handle 20 or may be an independent member that is positioned within the shaft 12. The fixed and sliding pulley members 36, 38 are connected by the first rope 44 to provide the smooth sliding motion to actuate the claw 24. It should be appreciated that the sliding pulley member 38 be configured to move within the shaft 12 such that sliding of the second handle 20 allows the sliding pulley member 38 to move the same distance, in an opposite direction, which actuates the pulley system to open or close the fingers 26 of the claw 24.

FIG. 8 is a schematic view of the pulley system 34 to show how the pulley system 34 operates the actuation of the claw. The first fixed pulley member 36 and the sliding pulley member 38 include pulleys 42 positioned thereon and configured to be operatively connected to a first rope 44. As shown, the first rope 44 may be attached or otherwise fixed to a portion of the fixed member 36 and wrapped around the pulleys 42 of the fixed and sliding members 36, 38 and finally ending and being fixed to the shuttle 40. In addition, a second rope 46 is attached or fixed at one end to the sliding pulley member 38 and extends through the shuttle 40 and towards the claw 24 where it is connected at or near the pivot points 28 of the fingers 26 of the claw 24 to actuate the rotation of the fingers 26 to open and close the claw 24. The first and second rope members 44, 46 may be a string, wire, rod, tube or other rigid member, cord, or virtually any other member that can be used with the pulleys and claw to actuate the claw by moving the second handle.

Movement of the second handle 20 along the shaft 12 will also move the shuttle 40 in a direction shown by the arrow 60 in FIG. 8. The movement of the shuttle 40 will pull on the first rope 44 extending through the fixed and sliding pulley members 36, 38. As the shuttle 40 moves in the direction shown by the arrow 60, the distance between the fixed and sliding pulley members 36, 38 will be reduced as the sliding pulley member 38 moves in the direction shown by the arrow 64 and toward the fixed pulley member 36. This will move the sliding pulley 38 towards the first end 14 of the shaft 12. As the sliding pulley member 38 moves towards said first end 14 of the shaft 12, it will pull on the second rope 46 in the same direction. The pulling or actuation of the second rope 46 will pull a pivot mechanism of the claw members to cause the claw members to rotate in the direction shown by the arrow 66 in the figures, which will move the claw members from a generally open configuration to a closed configuration, allowing the claws to close or grasp around an object or item to be moved by the reaching apparatus 10. Continued movement of the second handle 20 will further close the claw 24 until it reaches a fully closed configuration. The second handle 20 can then be rotated to lock the claw 24 in the closed configuration, which will allow an individual to move the item to its end use or location. At that location, the rotating and sliding of the handle can be reversed to unlock and open the claw 24 to release the object from the grasp of the fingers 26. Thus, sliding the second handle back towards the first handle will move the sliding pulley member 38 in the direction opposite that of the arrow 64, which will provide slack to the second rope 46 that will release the claw grip.

As mentioned, the reaching apparatus 10 may include an indicator or feedback device 56 that indicates to a user the status of the claw 24. For example, the indicator may be a haptic device such that some sort of force, vibration, or motion is felt by the reaching apparatus to indicate that the claw has moved from a locked to an unlocked configuration. In addition, auditory or visual feedback may also be provided with the reaching apparatus to indicate to the operator or user the status of the claw member. When auditory feedback is used, a speaker may be included with the apparatus 10 and electrically connected to a battery. When visual feedback is used, an electronic display may be used, or a rotating label may be used to indicate the status of the claw.

Other variations may be included with the reaching apparatus 10 of the invention. For example, the first and second ropes may be set to a specific linear resistance to activate the claws. As mentioned, the shaft may be telescoping or segmented to adjust the length of the reaching apparatus 10. The claw head 24 may be articulating or pivoting to address objects of different angles. This would allow the user to grab items on a high shelf in a straight configuration rather than at an angle. Other variations obvious to those in the art may be also included with the present invention and the invention is not to be limited to the exemplary embodiments shown and described.

What is claimed is:

1. A reaching apparatus, comprising:
a shaft having first and second ends;
a fixed handle positioned on the shaft adjacent the first end of the shaft;
a second handle positioned on the shaft and movable in relation thereto;
a claw positioned at the second end of the shaft and having an open configuration and a closed configuration; and
a pulley system generally within the shaft connected to the fixed handle, second handle, and claw, the pulley system comprising a fixed block, and a shuttle operatively connected to the fixed block and the claw such that movement of the second handle towards the claw moves the shuttle towards the fixed block, which closes the claw;
wherein sliding the second handle on the shaft away from the fixed handle causes the claw to move from the open configuration to the closed configuration.

2. The reaching apparatus of claim 1 further comprising a locking mechanism operatively attached to the second handle and pulley system.

3. The reaching apparatus of claim 2 wherein the locking mechanism is configured to lock the claw in a closed configuration when the second handle is rotated.

4. The reaching apparatus of claim 3 wherein the locking mechanism comprises first and second comb members configured to selectively interlock with one another to hold the claw in the closed position.

5. The reaching apparatus of claim 1 wherein the claw comprises two fingers movable relative to one another.

6. The reaching apparatus of claim 1 further comprising a first rope operatively connected to the fixed block and the shuttle via a movable block and a second rope operatively connected between the shuttle and the claw to move the claw between an open and a closed configuration.

7. The reaching apparatus of claim 1 wherein the claw further comprises attachment members located on the first and second grasping members of the claw.

8. The reaching apparatus of claim 7 wherein the attachment members comprise magnets, adhesives, or elastomers.

9. The reaching apparatus of claim 7 wherein the attachment members are positioned only on tips of the claw to aid in grasping items in the claw.

10. The reaching apparatus of claim 1 further comprising a haptic, auditory, or visual device operatively connected to the claw to provide feedback to indicate the status of the claw.

11. The reaching apparatus of claim 1 further comprising one or more lights operatively connected to the shaft to aid in viewing the area to use the claw of the reaching apparatus.

12. A reaching apparatus for providing distant grasping of an object using gross motor skills, comprising:
a first handle;
a second handle connected to the first handle via a pulley system and movable relative to the first handle; and
a claw operatively connected to the pulley system and comprising two or more grasping members movable relative to one another;

wherein the pulley system comprises a fixed block, and a shuttle operatively connected to the fixed block and the claw such that movement of the second handle towards the claw moves the shuttle towards the fixed block, which closes the claw;

wherein moving the second handle away from the first handle operates one or more ropes of the pulley system to open and close the grasping members of the claw.

13. The reaching apparatus of claim 12 further comprising a locking mechanism operatively attached to the second handle and pulley system.

14. The reaching apparatus of claim 13 wherein the locking mechanism is configured to lock the claw in a closed configuration when the second handle is rotated.

15. The reaching apparatus of claim 12 further comprising one or more attachment members positioned on at least one of the grasping members of the claw.

16. A reaching apparatus, comprising:
an extendable shaft having a first end and opposite second end;
a fixed first handle positioned at the first end of the shaft;
a movable second handle positioned adjacent the first handle on the shaft and connected to the first handle via a pulley system; and
a claw operatively connected to the first and second handles via the pulley system and comprising two or more grasping members movable relative to one another;
wherein the pulley system is housed at least partially within each of the handles and comprises a fixed block and a shuttle operatively connected to the fixed block and the claw such that movement of the second handle towards the claw moves the shuttle towards the fixed block, which closes the claw.

17. The reaching apparatus of claim 16 further comprising a locking mechanism operatively attached to the second handle and pulley system and configured to lock the claw in a closed configuration when the second handle is rotated.

18. The reaching apparatus of claim 17 further comprising a haptic, auditory, or visual device operatively connected to the claw to provide feedback to indicate the status of the grasping members of the claw.

* * * * *